(No Model.) 3 Sheets—Sheet 3.
S. ARNOLD.
HARVESTER RAKE TRIP.

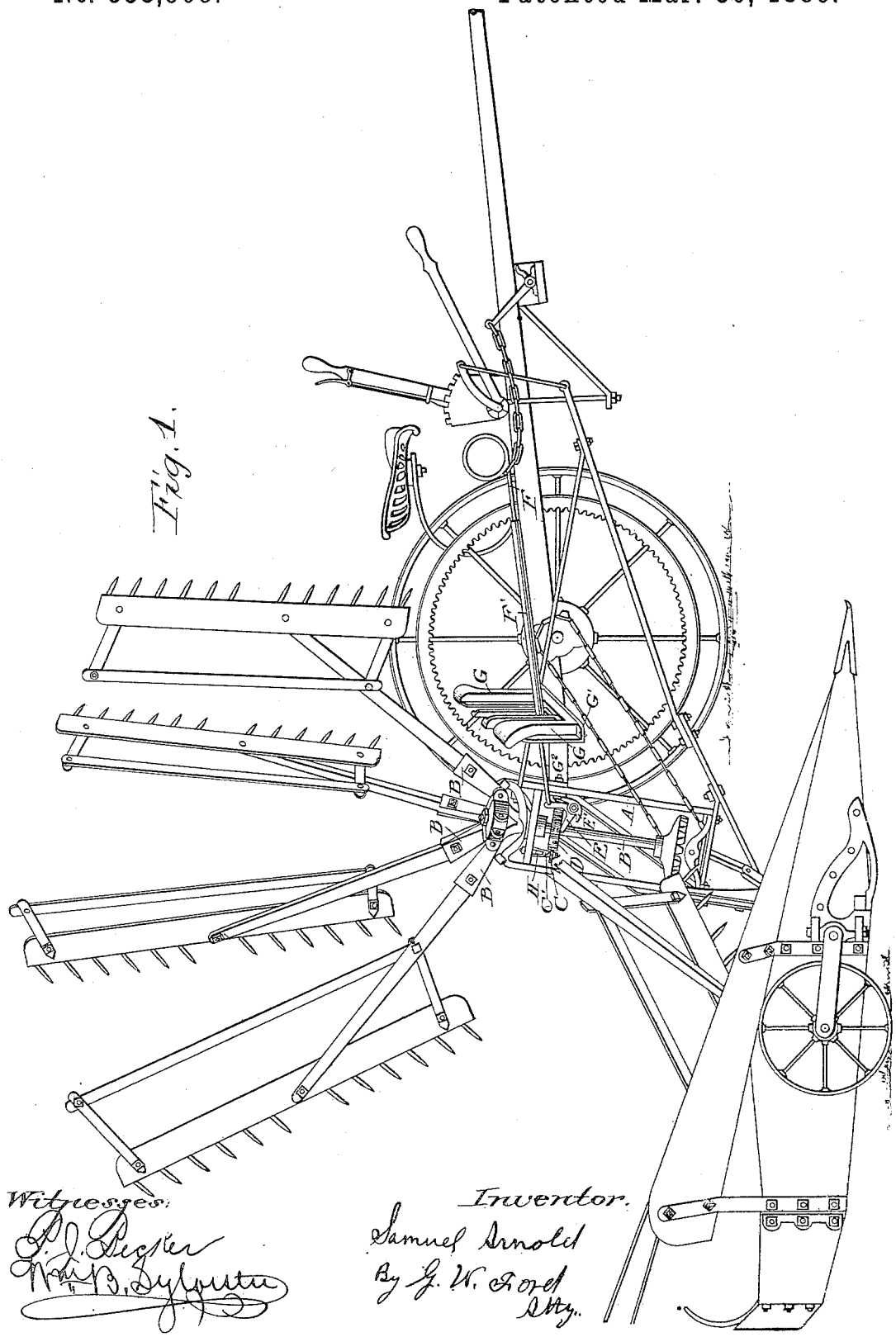

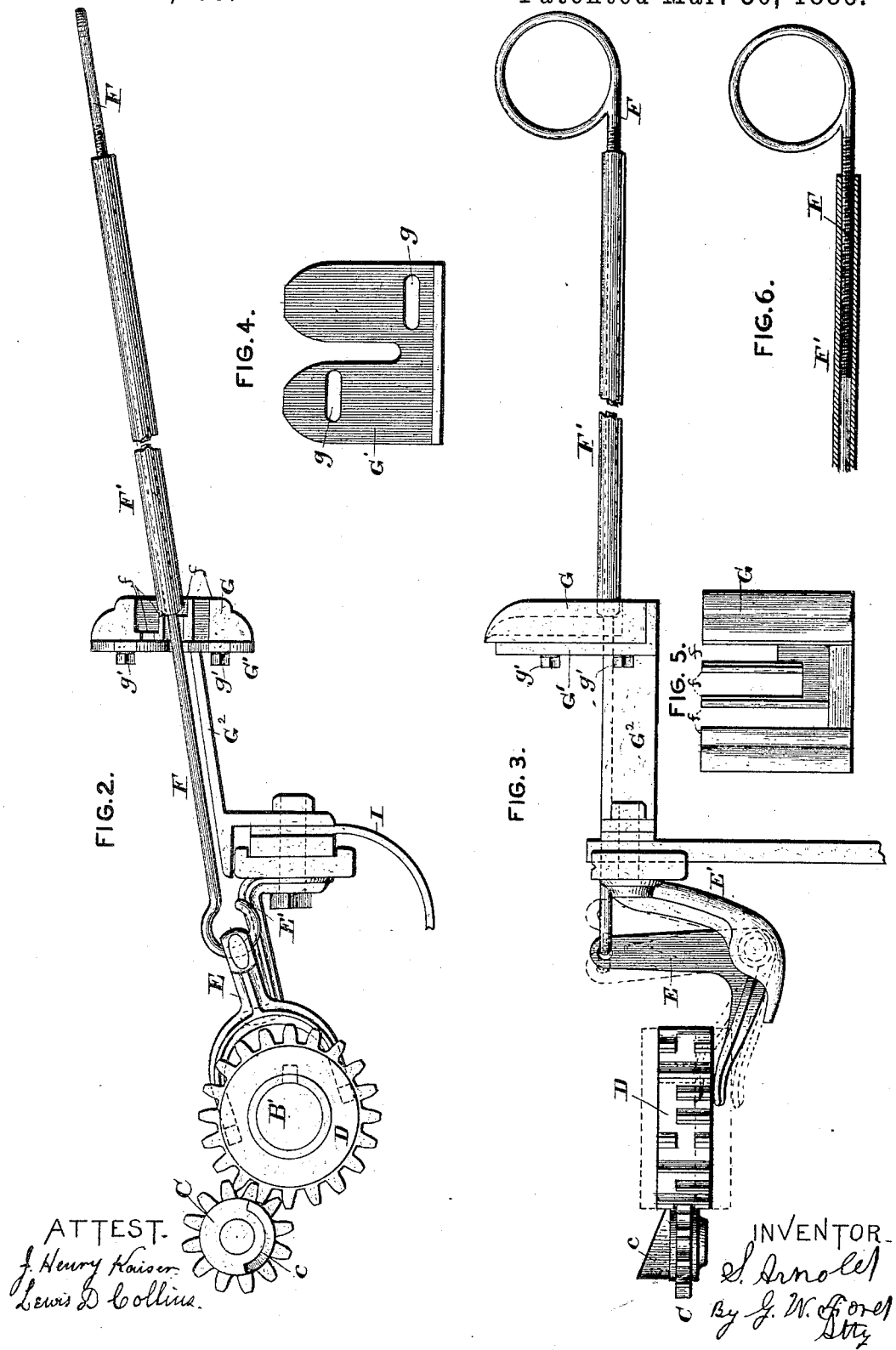

No. 338,908. Patented Mar. 30, 1886.

Witnesses:
P. J. Becker.
A. G. Morey.

Inventor:
Samuel Arnold
By J. W. Ford Atty

UNITED STATES PATENT OFFICE.

SAMUEL ARNOLD, OF LONDON, COUNTY OF MIDDLESEX, ENGLAND, ASSIGNOR TO THE JOHNSTON HARVESTER COMPANY, OF BATAVIA, NEW YORK.

HARVESTER-RAKE TRIP.

SPECIFICATION forming part of Letters Patent No. 338,908, dated March 30, 1886.

Application filed April 18, 1885. Serial No. 162,712. (No model.)

*To all whom it may concern:*

Be it known that I, SAMUEL ARNOLD, a citizen of Great Britain, residing at London, in the county of Middlesex, England, have invented a new and useful Harvester - Rake Trip, of which the following is a specification.

My invention relates to improvements in rake-tripping devices for harvesters in which the rakes are made to rise and fall by means of fixed cams secured to the rake-post, with a switch for changing the path of the rakes from a high to a low track, and vice versa, to cause the arms to act as beaters or rakes, as the nature of the work requires; and the objects of my improvements are to provide means for automatically opening the switch, so that in the revolution of the rake mechanism any desired rake may be brought in position to sweep the platform at a given time; also, to allow the adjustment to be made by the driver while upon his seat, and that without stopping his team, thereby making gavels of uniform size in light as well as in a heavy stand of grain. I attain these objects by the mechanism illustrated in the accompanying drawings, in which—

Figure 7:
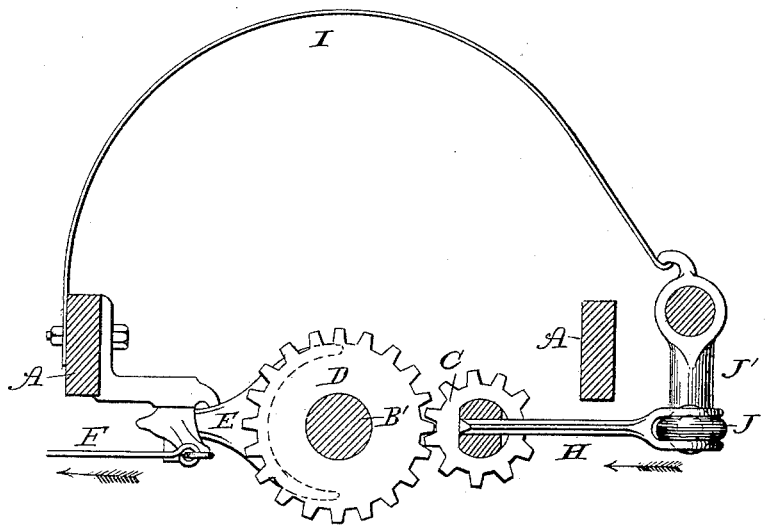
Figure 8:
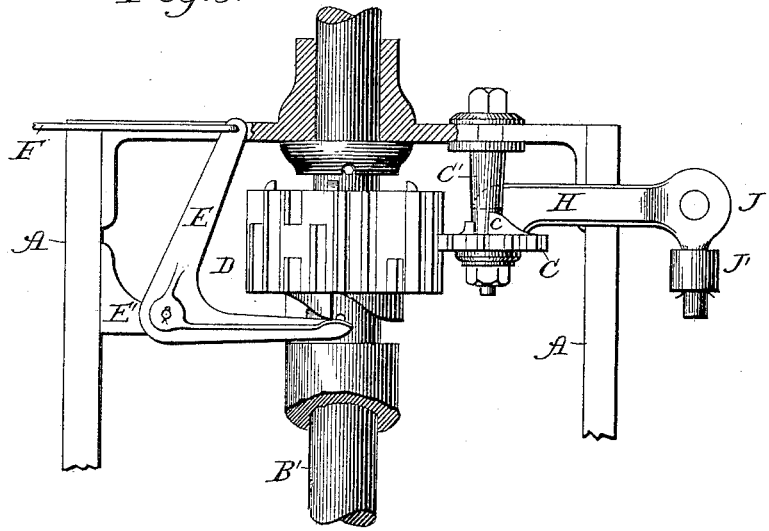

Figure 1 is a front perspective view of a portion of a harvester, taken from the grain side and showing the tripping device in working position. Fig. 2 is a top plan view of my tripping device detached from the harvester. Fig. 3 is a side elevation of the same, showing the various adjustments in dotted lines. Fig. 4 is a rear view of the gage-supporting bracket detached. Fig. 5 is a front view of the gage or adjusting-block detached. Fig. 6 is a longitudinal sectional view of the shifting-rod within the regulating-tube, each being screw-threaded, so that a nice adjustment can be made, as will be hereinafter explained; and Figs. 7 and 8 are views of details.

Similar letters refer to similar parts throughout the several views.

A is the frame upon which the rake-cams are mounted.

A² is the switch for changing the path of the rakes.

B is the rake-head, mounted upon the vertical shaft B', and driven by any suitable mechanism.

All of the above parts being of ordinary construction, a specific description will not be necessary.

C is a thin gear-wheel of about one-third the thickness of the wheel into which it meshes, and has upon its upper face a trip-cam, c. This cam-trip wheel has in this instance twelve cogs; but the number may be increased or diminished to accommodate the machine upon which it is mounted.

D is a larger gear-wheel, into which the cam-gear wheel meshes, and is about three times as thick as the said cam-wheel. This wheel D has three series of cogs or teeth, the teeth in each series differing in number, but all of the same pitch, so that any course will mesh into the teeth upon the trip-wheel. The lower course of teeth—twenty in number—are continuous and of even space. Above this is another row of fifteen teeth—three-fourths as many as are in the lower course. The upper or third tier contains twelve teeth, or the same number which is found in the cam-gear. In operation, the cam-gear is the driver-gear. While the larger one acts as the driver, and of course when the teeth of even number are in mesh, one revolution of the drive-wheel causes the driver-wheel to travel through its entire orbit, and will trip the switch so that it will open once during the revolution, which in this instance would make the fifth beater operative as a rake. Should it become necessary in a heavier stand of grain to make every fourth arm or beater become a rake, the drive-gear is raised, so that the center course of fifteen teeth comes in mesh with the cam-wheel, and as the drive-wheel travels four-fifths of its revolution to one rotation of the cam-wheel, the switch will open for the fourth rake. In case the gavels are still too large for convenience, the drive-gear is raised still farther, and the twelve-toothed driver-wheel is made to mesh into the twenty-toothed course on the driver, thus making the rotation as three to five, so that the third beater will be made to operate as a rake.

Practically, it is not considered necessary in the heaviest of grain to have (in a five-rake machine) less than every third beater act as a rake; yet should it be thought advisable, it can be easily done by having the driver made larger, or the driver-wheel smaller, as, it will be observed, it is not necessary to have even spaces between the teeth upon the driver, as the trip or driver wheel remains stationary while the blank space in the driver is passing, as the teeth only in the two wheels engage each other.

E is the trip-gear-raising fork, with a right-angled operating-arm, and E' is the bracket, to which the elbow of the fork is pivoted. A limb of this fork passes upon each side of the shaft B', and to the center of the wheel D, and resting upon the same, so that upon the release of the adjusting-rod from its detent the wheel is lowered, and will maintain its downward position by gravity alone.

F is a horizontal rod, connected at its rear end with the vertical portion of the forked lever, and extends far enough forward to be within reach of the driver upon his seat, and can be operated either by hand or foot, as desired.

F' is a tube having an internal screw-thread, which engages a corresponding thread upon the rod F, so that it can be longitudinally adjusted, for a purpose hereinafter explained.

G is an adjusting block or gage having as many slots of the diametrical size of the shipper-rod and of a number to correspond with the changes of speed in the trip-wheel. Upon each side of these slots are shoulders or flanges $f$, of different depths, against which the rear end of the tube F' abuts, and by means of which the gear-wheel D is held in the desired vertical position.

G' is a plate for holding the adjusting-block G, provided with slots $g$ and mounted upon an arm, $G^2$, the said arm being secured to the rake-frame in any well known manner.

$g'$ are screw-guides, which pass through slots $g$ and into the block G. These guide-screws have each a shoulder upon the head end which impinges against the back side of plate G', so that the block G is held in a true vertical position, but free to move laterally for the purpose of bringing the desired adjusting-slot in line with the slot in the stationary plate G', and within which the rod F rests while the machine is in operation.

H is the trip-latch, pivoted to stud J by a universal-joint connection to an arm, J', rigidly secured to the stem of the switch-gate by a leaf spring fastened at one end to the rake-frame, the other end of which engages with the tail end of the arm J, (see Figs. 7 and 8,) by means of which the switch is opened after the release of the latch, as is usually done. This trip latch is provided with a shoulder upon the under side of its free end, which, upon the closing of the switch, rests against the stud C', (the latch passing through a slot made in the stud for that purpose,) so that as the incline upon the trip-wheel comes in contact with the latch it is gradually raised until the spring is released, thus causing the switch to open for the passage of the rake that is to sweep the platform. After the passage of the rake, the switch is closed in the usual manner, where it remains until another revolution of the tripping-wheel, when the operation is repeated.

When it becomes necessary to change the beaters to rakes, the rod with the adjusting-tube is raised out of the detent where it previously rested and is placed in another, and as the rod is pressed down into the slot in the gage-block (which rises above the holding-plate G') it strikes upon the rounded portion in the upper end of the gain in the holding-plate, which moves the gage-block laterally, so as to bring the slots of the two parts in line when the rod is pressed to the bottom of the slot, and there remains until another change is made. By the raising or lowering of the wheel D (which at all times turns with the rake-shaft) a different line of gear is brought in contact with the trip-gear, with the consequent change in the travel of the beaters before they are made to operate as rakes, so that gavels can always be made of uniform size in the different stands of grain. Should any two series of teeth upon the wheel D clash with the teeth upon the cam-wheel, the tube upon the shipper-rod (which acts as a stop) can be turned to the right or left, and through the aid of the screw-threads upon each a perfect adjustment can be made.

Having now described my invention, what I claim, and desire to secure by Letters Patent, is—

1. The combination of the gear-wheel D, the forked shipping-lever, the lever-operating rod, and the graduated sliding adjusting-gage, substantially as described.

2. The combination of the gear D, the forked shipping-lever, the lever-operating rod, the graduated sliding gage G, and the screw-threaded adjusting-tube, all arranged and operating substantially as described.

3. The combination of the gear-wheels D C, the forked shipping-lever, the graduated movable gage G, the slotted plate G', the lever-operating rod, and the adjusting-tube, all arranged and operating substantially as described.

4. The combination of the adjusting-block G, the plate G', having slots $g$, guides $g'$, and brackets $G^2$, all arranged and operating substantially as described.

5. The combination of the thick gear-wheel D, constructed as shown and described, the cam-gear wheel C, spring I, and trip-latch H, arranged and operating substantially as described.

SAMUEL ARNOLD.

Witnesses:
 WILLIAM OLIVER,
 WILLIAM LOCKE BYNE,
  *Both of* 12 *Abchurch Lane, London.*